UNITED STATES PATENT OFFICE.

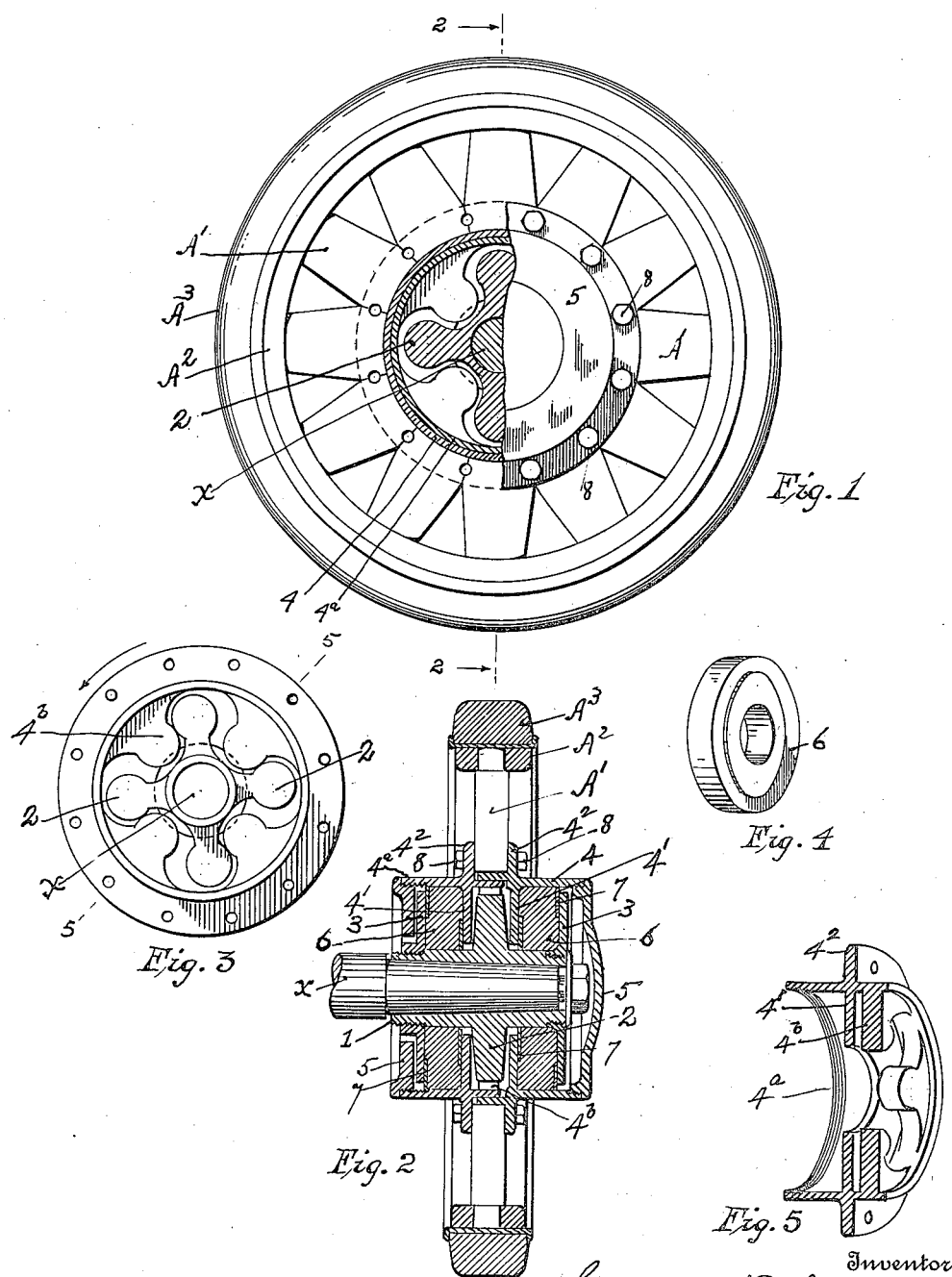

EDMUND H. WHITING, OF PROVIDENCE, RHODE ISLAND.

VEHICLE-WHEEL.

1,076,255.

Specification of Letters Patent. Patented Oct. 21, 1913.

Application filed March 3, 1913. Serial No. 751,970.

*To all whom it may concern:*

Be it known that I, EDMUND H. WHITING, a citizen of the United States, residing at Providence, in the county of Providence and State of Rhode Island, have invented a new and useful Vehicle-Wheel, of which the following is a specification.

The purpose of my invention is to provide a wheel for automobiles and other vehicles, which will serve as a shock absorber and thus make the vehicle more easy to ride in, and in which a solid rubber tire may be efficiently used in the place and stead of the pneumatic tire now commonly used.

To these ends my invention consists in the new and useful construction, combination and arrangement of parts hereinafter described, and illustrated in the accompanying drawings, in which—

Figure 1 is an elevation of a wheel embodying my invention, with parts broken away, and other parts shown in section. Fig. 2 is a sectional view on line 2—2 of Fig. 1. Fig. 3 is an elevation of the hub of the wheel with the cap removed. Fig. 4 is a perspective view of one of the annular shock absorbers. Fig. 5 is a perspective sectional view on line 5—5 of Fig. 3.

In the drawings $A^1$ represents the spokes of a wheel secured at their inner ends to the center or hub of the wheel by bolts 8.

$A^2$ represents the wheel rim attached in the well known manner to the outer ends of the spokes.

$A^3$ represents the solid tire or rubber or other resilient material, secured on said rim.

The central or hub portion of my wheel I construct as follows: A sleeve 1, arranged and adapted to serve as an axle box or bearing, is externally threaded on each end, and is provided with a plurality of radial outwardly projecting arms 2 disposed a distance apart. Upon each end of said sleeve 1 I secure an annular collar 3 to form a flange projecting in all directions beyond and perpendicularly to said sleeve. Surrounding one end of said sleeve 1 and its collar 3 is a cylindrical member 4, spaced a distance from the peripheral edge of said collar, and provided with an interior radially directed annular flange or rib $4^1$ spaced a distance from said sleeve 1, and with an exterior radially projecting flange $4^2$. Said flanges or ribs $4^1$ and $4^2$ are disposed a distance inward from the rear end of said cylindrical member. (Fig. 2). A cap 5 secured to the outer end of the cylindrical member covers the outer face of the hub. Said member 4 extends somewhat more than one half the length of the sleeve 1. A second cylindrical member $4^a$ surrounding the other end of the sleeve 1 is similarly provided with an interior annular rib or flange $4^1$ and an exterior flange $4^2$, and is further provided with a second interior annular rib $4^b$ spaced a distance from the rib $4^1$ and the end of the member $4^a$, and disposed in the path of the arms 2. A collar 3 and cap 5 are secured on the inner end of the sleeve 1, and said member $4^a$ is also spaced a distance from the peripheral edge of said collar.

It will be noted that the interior ribs $4^1$ of the members 4 and $4^a$ in connection with the collars 3 form annular boxes around the sleeve 1. In each of these annular boxes I fit annular rings of rubber (as 6), adapted to yield and permit the sleeve 1 and the axle $x$ borne therein to yield to any shock imparted to the wheel rim. In other words, the annular rubber rings 6 will act as shock absorbers and thereby relieve the vehicle from jars and render it smoother and more comfortable to ride in.

By reason of the novel and useful construction and arrangement of the described parts I am enabled to dispense with pneumatic tires and to use in their stead tires of solid rubber, or other material of sufficient resiliency to insure grip of the tire upon the road bed, and thus avoid the liability and expense of punctured tires. One of said members 4 and $4^a$ I construct of greater diameter than the other so that one may enter the other at their inner ends with some free space between their edges, and be there firmly secured together by the bolts 8 which also serve to bind the ends of the spokes $A^1$ inserted between the exterior flanges $4^2$ of the said members. The arms 2 are preferably provided with tapering side faces to permit a degree of lateral movement of said arms between the adjacent faces of the interior ribs or flanges $4^1$ on occasions when the rim of the wheel is subjected for any reason to lateral strains in either direction, as for instance in turning out sidewise from a street car rail. Annular washers, as 7, may be applied each side of the rubber rings 6 to prevent the rubber being crowded out into the spaces between the members 4 and 4ª, and the collars 3 and sleeve 1.

In the practical operation of my invention the parts being assembled, as described and shown, and the wheel being driven, say in the direction of the arrow in Fig. 3, the arms 2 will move forward into contact with the interior lugs 4ᵇ and continue in such contact so long as the wheel is moved in the indicated direction. When the wheel is reversed the arms 2 will contact with the ribs 4ᵇ in the reverse direction.

I claim:

1. In a vehicle wheel the combination with an axle box provided with external radially projecting arms, annular collars secured upon each end of said box and constituting flanges therefor, a cylindrical member provided with internal radially extending ribs, and with an external radially projecting rib, said member loosely surrounding said collar at one end of said box, and spaced as to itself and said internal rib a distance from said collar and box, a second cylindrical member of smaller diameter than the first member and similarly fitted upon the opposite end of said axle box, and provided with a similar internal radially extending rib, and also with an internal radially extending lug, adapted to lie in the path of the radial arms of the axle box when the said two members are united, spokes disposed between the adjacent external ribs on said members, and bolts passing through said ribs and spokes and thereby securing the whole.

2. In a vehicle wheel the combination with an axle box provided with external radially projecting arms, annular collars secured upon each end of said box and constituting flanges therefor, a cylindrical member provided with an external radially projecting rib, and also with an internal radially extending rib, said member loosely surrounding said collar at one end of said box and spaced as to itself and said internal rib a distance from said collar and box, an annular resilient ring surrounding said end of said box and disposed in the space between said internal rib and said collar, a second cylindrical member of smaller diameter than the first member and similarly fitted upon the opposite end of said axle box and provided with a similar internal radially extending rib, a similar external radially projecting rib, and also with an internal radially extending lug adapted to lie in the path of the radial arms of the axle box when said two members are united, an annular resilient ring surrounding said opposite end of said axle box and disposed in the space between said internal rib of said second member and the collar on said axle box end, spokes disposed between the adjacent external ribs on said members, and bolts passing through said ribs and thereby securing the whole together.

EDMUND H. WHITING.

Witnesses:
ALFRED WILSON,
HENRY MARSH, Jr.